United States Patent [19]

MacDougall

[11] Patent Number: 4,586,112
[45] Date of Patent: Apr. 29, 1986

[54] CAPACITOR WITH IDLER

[75] Inventor: Frederick W. MacDougall, Marion, Mass.

[73] Assignee: Aerovox Incorporated, New Bedford, Mass.

[21] Appl. No.: 605,102

[22] Filed: Apr. 30, 1984

[51] Int. Cl.$^4$ ............................................. H01G 4/38
[52] U.S. Cl. ................................................. 361/330
[58] Field of Search ............... 29/25.42; 361/273, 328, 361/329, 330

[56] References Cited

U.S. PATENT DOCUMENTS

| | | | |
|---|---|---|---|
| 1,746,469 | 2/1930 | Grunow | 361/317 |
| 2,367,152 | 1/1945 | Strab | 117/71 |
| 2,388,139 | 10/1945 | Grouse et al. | 270/32 |
| 2,634,315 | 4/1953 | Allison et al. | 361/330 |
| 2,765,432 | 10/1956 | Sleegers | 317/260 |
| 2,949,570 | 8/1960 | Rayburn | 361/330 |
| 3,048,750 | 8/1962 | Netherwood et al. | 317/258 |
| 3,419,770 | 12/1968 | Tomago et al. | 317/258 |
| 3,435,308 | 3/1969 | Fanning | 317/260 |
| 3,483,453 | 12/1969 | Meyers | 361/330 |
| 3,508,128 | 4/1970 | Allison | 361/330 |
| 3,584,272 | 6/1971 | Martin | 317/260 |
| 3,740,623 | 6/1973 | Toro | 361/273 X |
| 4,229,777 | 10/1980 | Merrill et al. | 361/314 |
| 4,352,145 | 9/1982 | Stockman | 361/329 |

Primary Examiner—Donald A. Griffin

[57] ABSTRACT

A capacitor having two metal foil electrodes connected to two terminals, and a metallized idler having an electrically non-conducting substrate with a metal coating thin enough to be self-healing at pre-determined voltage levels, the metal coating being capacitively coupled to each of the electrodes.

17 Claims, 6 Drawing Figures

CAPACITOR WITH IDLER

BACKGROUND OF THE INVENTION

This invention relates to electrical capacitors and particularly to high energy density capacitors.

A high voltage, high energy density capacitor can be achieved by choosing two electrodes and a thick dielectric separating the electrodes. The thicker the dielectric, the greater the concentration of stress at the edge of the electrode. This concentration of stress becomes the limiting factor in the design of the capacitor due to dielectric failure in the high stress area.

By inserting a conductive layer idler (so-called because it is not attached to either of the terminals of the capacitor) between the two electrodes, one can form in effect two capacitors in series, one between one electrode and the idler, the other between the other electrode and the idler. Each of the two capacitors then need handle only a portion of the applied voltage. The geometry of such a configuration will reduce the edge stress significantly even though the average stress on the dielectric material remains the same. A series of many capacitances can be formed by inserting a stack of idlers between the electrodes.

In the course of manufacture, a capacitor's dielectric system may be damaged. The damage may result from local imperfections in the dielectric, irregularities in the electrode, or foreign particles which enter the capacitor winding. These damaged areas are identified when the capacitor is energized and the imperfect area breaks down. Such faults may render the capacitor unusable. The incidence of such faults is directly related to the total electrode area within the capacitor.

Capacitors wound with metallized electrodes (i.e., a dielectric such as paper or polypropylene with extremely thin coatings of a conductor such as aluminum or zinc) can be self-clearing. A fault in the capacitor can be cleared by applying the appropriate voltage to eliminate the conducting electrode at the point of the fault. This is normally done by vaporization of the electrode or conversion of the electrode from a metal to an insulating metal oxide. This will then render the capacitor usable.

Capacitors built with metallized electrodes have a limited current carrying capability. The current limit is generally associated with the connection between the metallized electrode and the external terminals. This limits the capacitor's usefulness in high energy discharge applications.

SUMMARY OF THE INVENTION

In general, the invention features a capacitor having two metal foil electrodes, two terminals connected respectively to those electrodes, and a metallized idler (having an electrically non-conducting substrate with a metal coating thin enough to be self-clearing) that is capacitively coupled to each of the electrodes.

In preferred embodiments, there are a plurality of metallized idlers each capacitively coupled to at least one other metallized idler; the capacitor includes a metal foil idler and a plurality of metallized idlers, the metal foil idler being capacitively coupled only to a pair of the metallized idlers; the electrodes are not overlapping; the metal coating is no more than an average of 2000 Å, preferably no less than about 300 Å, thick; the electrically non-conducting substrate has a metal coating on one side or on both sides; the electrically non-conductive substrate is impregnated with a liquid dielectric impregnant; and the electrically non-conductive substrate is paper.

Faults in the capacitor windings, such as foreign metal particles or irregularities, will self-clear by vaporization of, or chemical changes in, the thin metal coating of the metallized idler at the sites of faults when voltage is applied at predetermined levels, rendering the faults non-conductive, thereby preventing short circuits and allowing the capacitor to be operated at higher electrical stresses. Because the metallized idlers are not directly connected to the terminals, electrical discharge is not impeded and the destruction of end connections under high current pulses is avoided. The paper substrate of the metallized idler acts as a wick to facilitate impregnation of the capacitor with dielectric fluid. Energy density is higher than in standard aluminum foil electrode capacitors. In the case of metallized idlers coated with metal on only one side, the paper substrate cooperates with the adjacent dielectric and the capacitor can be physically smaller.

Other advantages and features will become apparent from the followng description of the preferred embodiment, and from the claims.

DESCRIPTION OF THE PREFERRED EMBODIMENT

We first briefly describe the drawings.

DRAWINGS

Figure 1A:
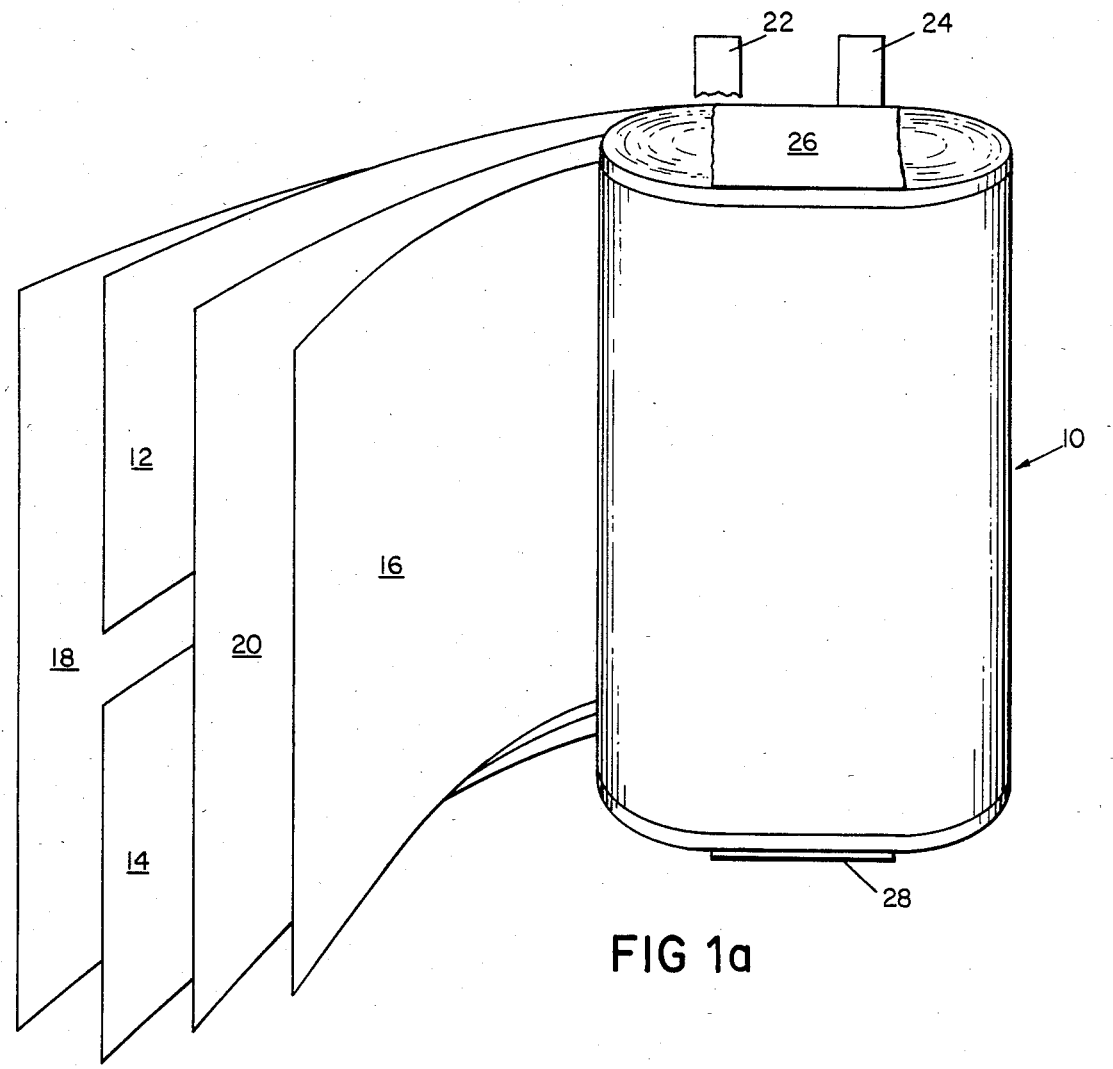
Figure 1B:
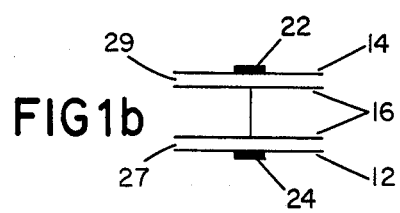

FIGS. 1a and 1b are, respectively, a perspective view of a capacitor (removed from its can and partially unwrapped) in accordance with the preferred embodiment, and a schematic representation of the capacitor.

FIGS. 2a, 2b, and 3a, 3b, are, respectively, perspective views and schematics of capacitors in accordance with two alternate embodiments.

STRUCTURE, MANUFACTURE, AND OPERATION

Referring to FIG. 1a, a wound capacitor 10 has two terminal tabs 22, 24 connected respectively to two aluminum foil electrodes 12, 14 arranged side by side (i.e., not overlapping) and sandwiched between two dielectric strips 18, 20. A metallized idler 16, located on the other side of dielectric strip 20 from the two aluminum foil electrodes 12, 14, is a strip of electrically non-conductive paper substrate coated on both sides with a thin layer of metal no more than an average of 2000 Å (i.e., sufficiently thin to be self-clearing), preferably no less than about 300 Å, thick. The dielectric strips 18, 20 and the paper substrate of the metallized idler 16 are impregnated with a dielectric fluid. During manufacture, the paper substrate acts as a wick to draw the dielectric fluid into the capacitor. The ends 26, 28 are spray coated with zinc or other suitable metal in order to make a strong electrical and mechanical connections between the exposed edges respectively of aluminum foil electrodes 12, 14 and the terminal tabs 22, 24. These electrical connections permit quick discharge of the capacitor, and remain strong even when subjected to high current pulses.

Referring to FIG. 1b, the arrangement of electrodes 12, 14, and idler 16 effectively forms two capacitances 27, 29, connected in series. Capacitances 27, 29, 30 comprise electrodes 12, 14 respectively coupled through dielectric sheet 20 to the metal coating of idler 16.

Capacitor 10 is charged by applying a voltage across terminals 22, 24. At the locations of faults, the metal coating of the metallized idler electrode 16 vaporizes or converts to a non-conducting material at a predetermined voltage level less than full operating voltage, thus healing capacitor 10 and permitting continued operation.

OTHER EMBODIMENTS

Other embodiments are within the following claims.

Figure 2A:
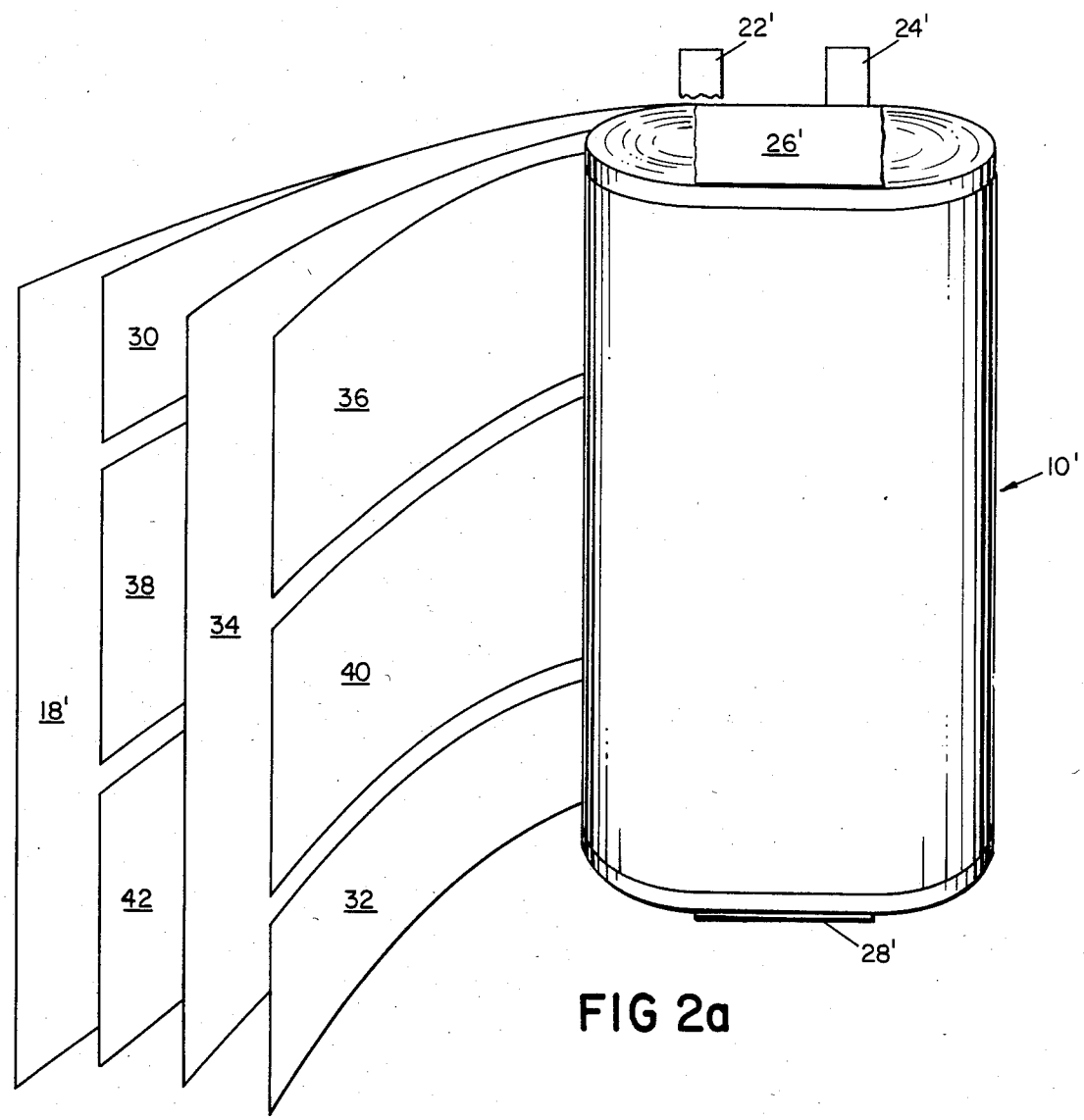
Figure 2B:
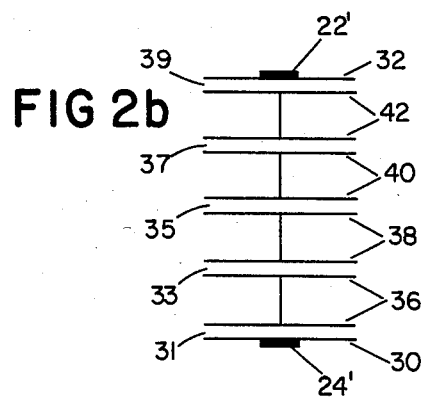

For example, referring to FIG. 2a, metal foil electrodes 30, 32 are arranged on opposite sides of a dielectric 34; with metallized idlers 36, 38, 40, 42 arranged alternately on opposite sides of the dielectric 34 such that each idler is capacitively coupled either to two other metallized idler electrodes or to a metallized idler electrode and one of the electrodes 30, 32. Referring to FIG. 2b, this arrangement effectively forms five capacitors 31, 33, 35, 37, 39 connected in series. The advantage of the wicking action of the metallized idlers is enhanced by placing them on both sides of dielectric 34.

Figure 3A:
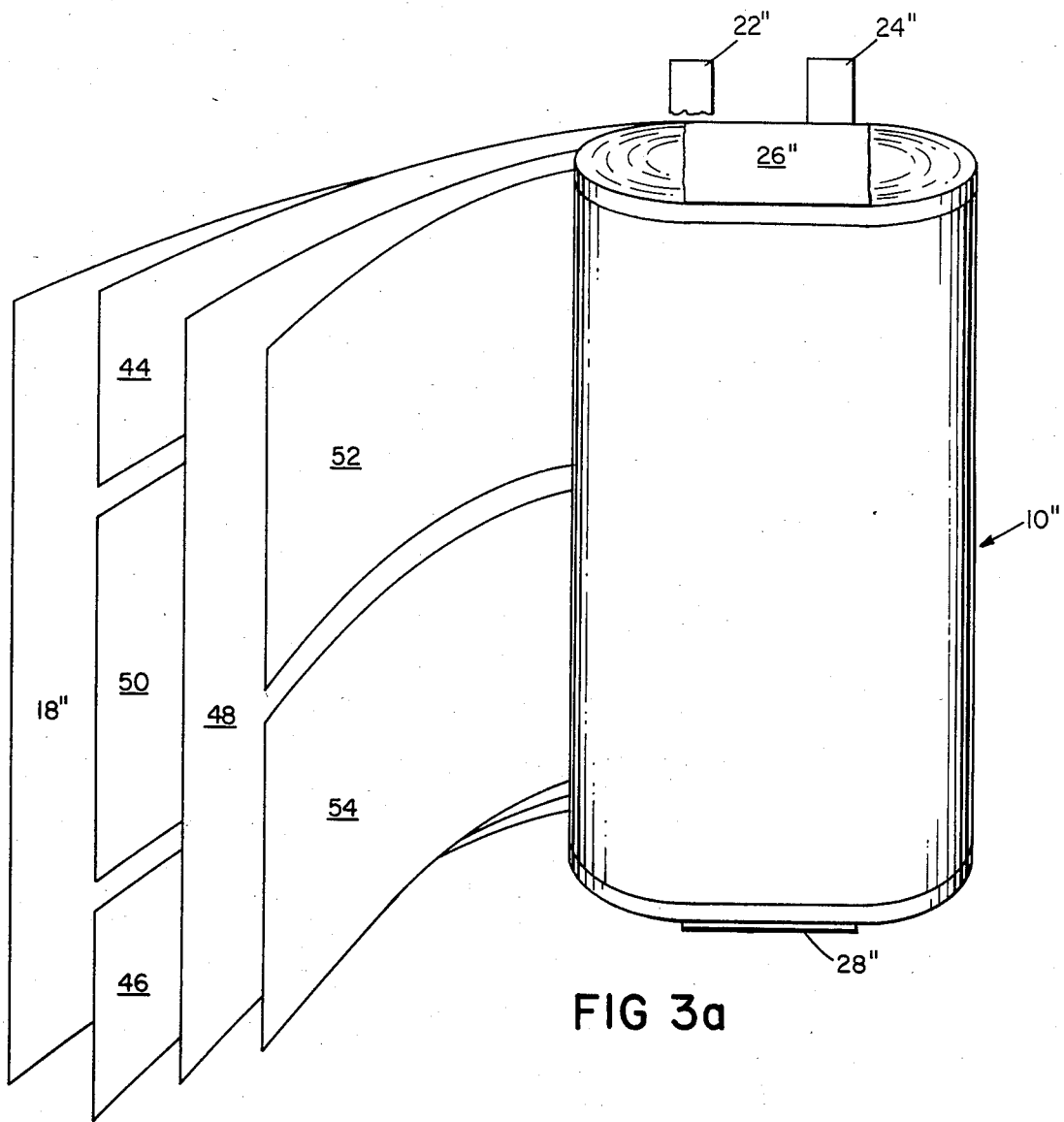
Figure 3B:
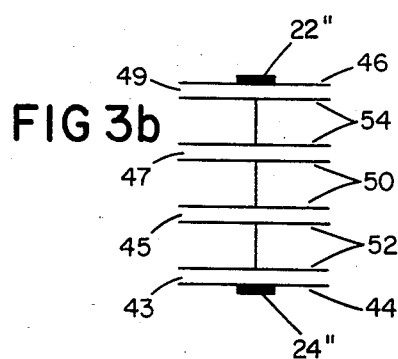

Referring to FIG. 3a, two metal foil electrodes 44, 46 are on one side of a dielectric 48 with a metal foil idler 50 placed between, but not in contact with, them. Two metallized idlers 52, 54 are arranged side by side on the opposite side of dielectric 48 such that each overlaps one of electrodes 44, 46 and metal foil idler 50. Because the capacitor of FIG. 3 uses a metal foil idler, it is less expensive to manufacture than capacitors having only metallized idlers. Referring to FIG. 3b, this arrangement effectively forms four capacitors 43, 45, 47, 49 arranged in series.

The metallized idlers can be coated on only one side, in which case the dielectric substrate cooperates with the adjacent dielectric layer and the capacitor can be more compact.

What is claimed is:

1. A capacitor comprising two metal foil electrodes, two terminals connected respectively to said electrodes, and a plurality of metallized idlers, wherein each said metallized idler is capacitively coupled to at least one other metallized idler, and wherein each metallized idler comprises an electrically non-conducting substrate with a metallized coating capacitively coupled to said metal foil electrodes.

2. The capacitor of claim 1 wherein said two electrodes are not overlapping.

3. The invention of claim 1 in which said metal coating is no more than an average of 2000 Å thick.

4. The invention of claim 1 in which said metal coating is no less than about 300 Å thick.

5. The invention of claim 1 in which the electrically non-conducting substrate has a metal coating on both sides.

6. The invention of claim 1 in which the electrically non-conducting substrate has a metal coating on one side.

7. The invention of claim 1 in which the electrically non-conductive substrate is impregnated with a liquid dielectric impregnant.

8. The invention of claim 1 in which the electrically non-conductive substrate is paper.

9. A capacitor comprising two metal foil electrodes, two terminals connected respectively to said electrodes, a metal foil idler, and a plurality of metallized idlers, wherein said metal foil idler is capacitively coupled to a pair of metallized idlers, and wherein each metallized idler comprises an electrically non-conducting substrate with a metallized coating capacitively coupled to said metal foil electrodes.

10. A capacitor of the high-energy-density type, comprising two metal foil electrodes, two terminals connected respectively to said electrodes, and a metallized idler having an electrically non-conducting substrate with a metallized coating thinner than said metal foil electrodes and capacitively coupled thereto.

11. The capacitor of claim 10 wherein said two electrodes are not overlapping.

12. The invention of claim 10 in which said metal coating is no more than an average of 2000 Å thick.

13. The invention of claim 10 in which said metal coating is no less than about 300 Å thick.

14. The invention of claim 10 in which the electrically non-conducting substrate has a metal coating on both sides.

15. The invention of claim 10 in which the electrically non-conducting substrate has a metal coating on one side.

16. The invention of claim 10 in which the electrically non-conductive substrate is impregnated with a liquid dielectric impregnant.

17. The invention of claim 10 in which the electrically non-conductive substrate is paper.

* * * * *